United States Patent
Adams et al.

(10) Patent No.: US 6,769,584 B2
(45) Date of Patent: Aug. 3, 2004

(54) DOUBLE DECKER ARTICLE CARRIER FOR RECEIVER ASSEMBLY

(75) Inventors: Katherine A. Adams, Mishawaka, IN (US); Jason R. Moldthan, Osceola, IN (US); Richard W. McCoy, Granger, IN (US)

(73) Assignee: Cequent Towing Products, Inc., Plymouth, MI (US)

( * ) Notice: Subject to any disclaimer, the term of this patent is extended or adjusted under 35 U.S.C. 154(b) by 0 days.

(21) Appl. No.: 09/968,764

(22) Filed: Oct. 2, 2001

(65) Prior Publication Data

US 2002/0074371 A1 Jun. 20, 2002

Related U.S. Application Data

(60) Provisional application No. 60/243,381, filed on Oct. 26, 2000.

(51) Int. Cl.$^7$ .................................................. B60R 9/06
(52) U.S. Cl. .................... 224/518; 224/519; 224/524; 224/525; 224/564; 224/565
(58) Field of Search ................................ 224/274, 309, 224/402, 518, 519, 520, 521, 524, 525, 564, 565; 296/37.1, 37.6

(56) References Cited

U.S. PATENT DOCUMENTS

| | | | | |
|---|---|---|---|---|
| 3,181,755 A | * | 5/1965 | Lingley | 224/309 |
| 4,052,081 A | * | 10/1977 | Becker, III | |
| 4,804,120 A | * | 2/1989 | Kraklio | 224/525 |
| 4,915,276 A | * | 4/1990 | Devito | 224/521 |
| 4,971,234 A | * | 11/1990 | Hay | |
| 4,989,765 A | * | 2/1991 | Huebner | |
| 5,181,822 A | * | 1/1993 | Allsop et al. | 224/402 |
| 5,381,939 A | * | 1/1995 | Tippets | 224/309 |
| 5,460,304 A | * | 10/1995 | Porter et al. | |
| 5,676,292 A | * | 10/1997 | Miller | 224/524 |
| 5,680,975 A | * | 10/1997 | Stapleton | |
| 5,820,004 A | * | 10/1998 | Lane | |
| 5,857,741 A | * | 1/1999 | Anderson | 224/521 |
| 6,010,049 A | * | 1/2000 | Stein | |
| 6,044,775 A | * | 4/2000 | Lashlee et al. | |
| 6,082,269 A | * | 7/2000 | Padberg | |
| 6,095,387 A | * | 8/2000 | Lipscomb | |
| 6,152,339 A | * | 11/2000 | Kreisler | 224/309 |
| 6,244,483 B1 | * | 6/2001 | McLemore et al. | 224/521 |
| 6,263,867 B1 | * | 7/2001 | Skelton | 296/37.1 |

FOREIGN PATENT DOCUMENTS

FR  2593128 A1 * 7/1987 ................. 296/37.1

* cited by examiner

Primary Examiner—Gary E. Elkins
(74) Attorney, Agent, or Firm—King & Schickli, PLLC

(57) ABSTRACT

A double decker article carrier for mounting to a receiver assembly includes a frame having a pair of mounting bars for securing the frame to the receiver assembly and a pair of support members. A first platform is carried by the mounting bars and a second platform is carried by the support members. The platforms are carried in an aligned, stacked configuration with one over the other.

8 Claims, 4 Drawing Sheets

US 6,769,584 B2

DOUBLE DECKER ARTICLE CARRIER FOR RECEIVER ASSEMBLY

This application claims the benefit of U.S. Provisional Patent Application Ser. No. 60/243,381 filed Oct. 26, 2000.

TECHNICAL FIELD

The present invention relates generally to accessories for mounting on receiver assemblies and, more particularly, to a double decker article carrier for mounting in an accessory receiver of a receiver assembly.

BACKGROUND OF THE INVENTION

It has long been known to construct towing hitches that are mounted to vehicles in order to allow the towing of trailers or the like. In recent years such hitches have been designed to include a receiver box having a rearwardly directed opening or cavity for the receipt of a hitch or draw bar that carries a hitch ball or other means allowing connection to a trailer. Examples of such a structure include the Insta-Hitch II and Custom Hitch Receiver 35365 as manufactured by Reese Products, Inc. of Elkhart, Ind. Such a hitch receiver is also disclosed in, for example, U.S. Pat. No. 3,768,837 to Reese, owned by Reese Products, Inc.

Recent efforts to enhance the versatility of a hitch receiver have led to development of various accessories (e.g., both open and closed article carriers, bike racks, ski racks, tables, winches or other equipment) mounted by means of an accessory mounting bar in the receiver box of a trailer hitch receiver assembly. Because of their convenience and suitability to the particular applications/interests of the user, such accessories have become very popular.

In order to allow for or accommodate trailer towing and accessory mounting simultaneously, a trailer hitch assembly with both a trailer hitch receiver and accessory receivers has been recently developed and is the subject of, for example, U.S. Patent Applications Ser. Nos. 60/194,502, filed Apr. 3, 2000 and 60/243,486 filed Oct. 26, 2000. This new receiver assembly includes a central frame member, a mounting bracket carried on each end of the central frame member for securing the central frame member to the vehicle, a hitch receiver box carried on the central frame member and at least one accessory port for receiving and holding a recreational and/or utilitarian accessory.

The present invention relates to a double decker article carrier particularly adapted for mounting in a receiver box and/or accessory receiver of a receiver assembly. The article carrier allows the user heretofore unknown versatility in arranging and transporting articles.

SUMMARY OF THE INVENTION

In accordance with the purposes of the present invention as described herein, a double decker article carrier is provided for mounting to a trailer hitch receiver on a towing vehicle. The article carrier includes a frame having at least one mounting bar and at least one support member. A first platform is carried on the mounting bar. A second platform is carried on the support member.

More particularly describing one particular embodiment of the invention, the double decker article carrier includes a frame having a pair of mounting bars for securing the frame to the receiver assembly and a pair of support members. A first platform is carried on the pair of mounting bars and a second platform is carried on the pair of support members. Fasteners are provided for securing the first and second platforms to the pair of mounting bars and pair of support members respectively.

In one possible embodiment the support members are substantially L-shaped. Further, at least one tie rod may be secured to the first platform. Additionally, at least one tie rod may be secured to the second platform. Additionally, the platforms are carried in an aligned, stacked configuration. This structural arrangement allows tremendous versatility in carrying various articles of different types in a most secure and efficient manner.

In the following description there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention and together with the description serve to explain the principles of the invention. In the drawings.

Reference will now be made in detail to the present preferred embodiment of the invention, an example of which is illustrated in the accompanying drawings.

DETAILED DESCRIPTION OF THE INVENTION

Figure 1:
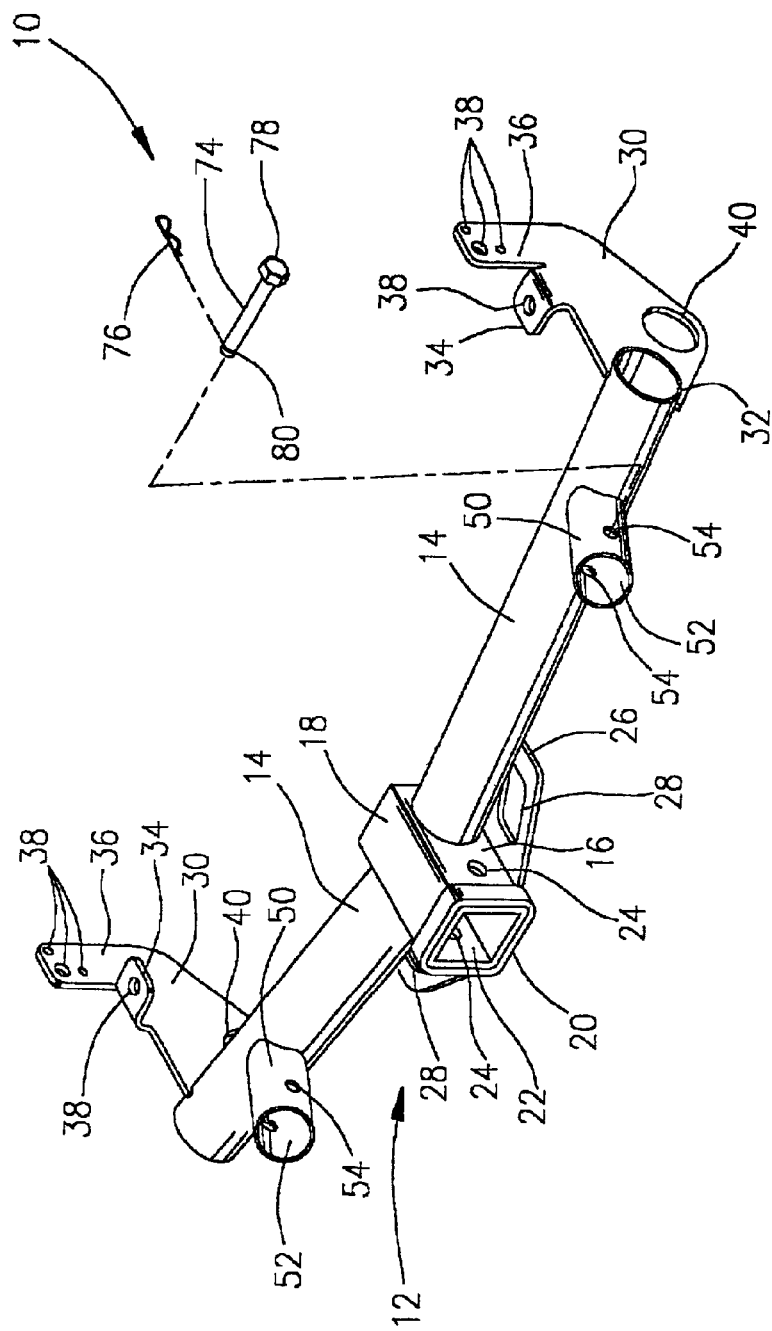
FIG. 1 is a perspective view showing a trailer hitch receiver assembly of the type to which the double decker article carrier of the present invention may be mounted.

Reference is now made to FIG. 1 showing a receiver assembly, generally designated by reference numeral 10.

The receiver assembly 10 includes a central frame member or cross member 12 preferably formed from a pair of tubular steel sections 14 welded to the opposed side walls 16 of a centrally located receiver box 18 so as to project outwardly in opposing directions. The tubular steel sections 14 may be formed with a round cross section as shown in the drawing figures, a square cross section or any other appropriate shape providing the necessary strength to function as a receiver assembly.

The receiver box 18 includes a reinforced lip 20 defining an opening leading to a hitch bar receiving cavity 22. Aligned apertures 24 in the opposing side walls 16 of the receiver box 18 allow the secure connection of a hitch bar in the receiver box in a manner well known in the art by means of a connecting pin and cooperating pin clip (not shown). A chain plate 26 of steel material is welded to the receiver box 18 and tubular steel sections 14 in order to strengthen the connection. As is known in the art, chain plate 26 includes two apertures 28. The safety chains of a trailer may be connected to the chain plate 26 through engagement in these apertures 28.

Vehicle mounting brackets 30 are mounted adjacent the distal end of each tubular section 14. More specifically, each mounting bracket 30 includes a notch 32 sized and shaped to receive the tubular section 14. The brackets 30 are welded to the tubular sections 14 in order to complete the connection. The mounting brackets 30 each include a mounting flange 34 and an upwardly projecting mounting lug 36, both with apertures 38. Nut and bolt fasteners (not shown) are extended through these apertures 38 and cooperating apertures drilled in the frame of the towing vehicle in order to mount the trailer hitch assembly 10 thereto.

As also shown in FIG. 1, the receiver assembly 10 incorporates a pair of tow hooks or loops 40, one integrally formed in each mounting bracket 30. The tow hooks 40 may be engaged with a tow line such as a rope, chain or cable in order to complete certain towing applications. As also shown, the receiver assembly 10 includes a pair of accessory receivers 50 carried on the tubular sections 14 of the central frame member 12. Each of the accessory receivers 50 is formed from a steel tube that is welded to the section 14 so that one accessory receiver is positioned between the receiver box 18 and each mounting bracket 30.

As shown, each accessory receiver 50 includes a circular port or opening 52 and cooperating aligned apertures 54 in the sidewall thereof to allow secure connection of a useful accessory by means of a connecting pin and pin clip of a type well known in the art such as utilized to secure the hitch bar in the receiver box 18. Each of the accessory receivers 50 is oriented with respect to the central frame member 12, receiver box 18 and the towing vehicle upon which the assembly 10 is mounted so as to be readily accessible by the towing vehicle operator. More specifically, each falls in a first plane which defines an included angle of between about 10° to about 30° (e.g. 20°) with a second plane which contains the longitudinal axis of the receiver box 18 and the central frame member 12. Thus, the accessory receivers 50 have a port or opening 52 that opens upwardly for better visibility and accessibility that directly leads to easy connection of an accessory.

Figure 2:
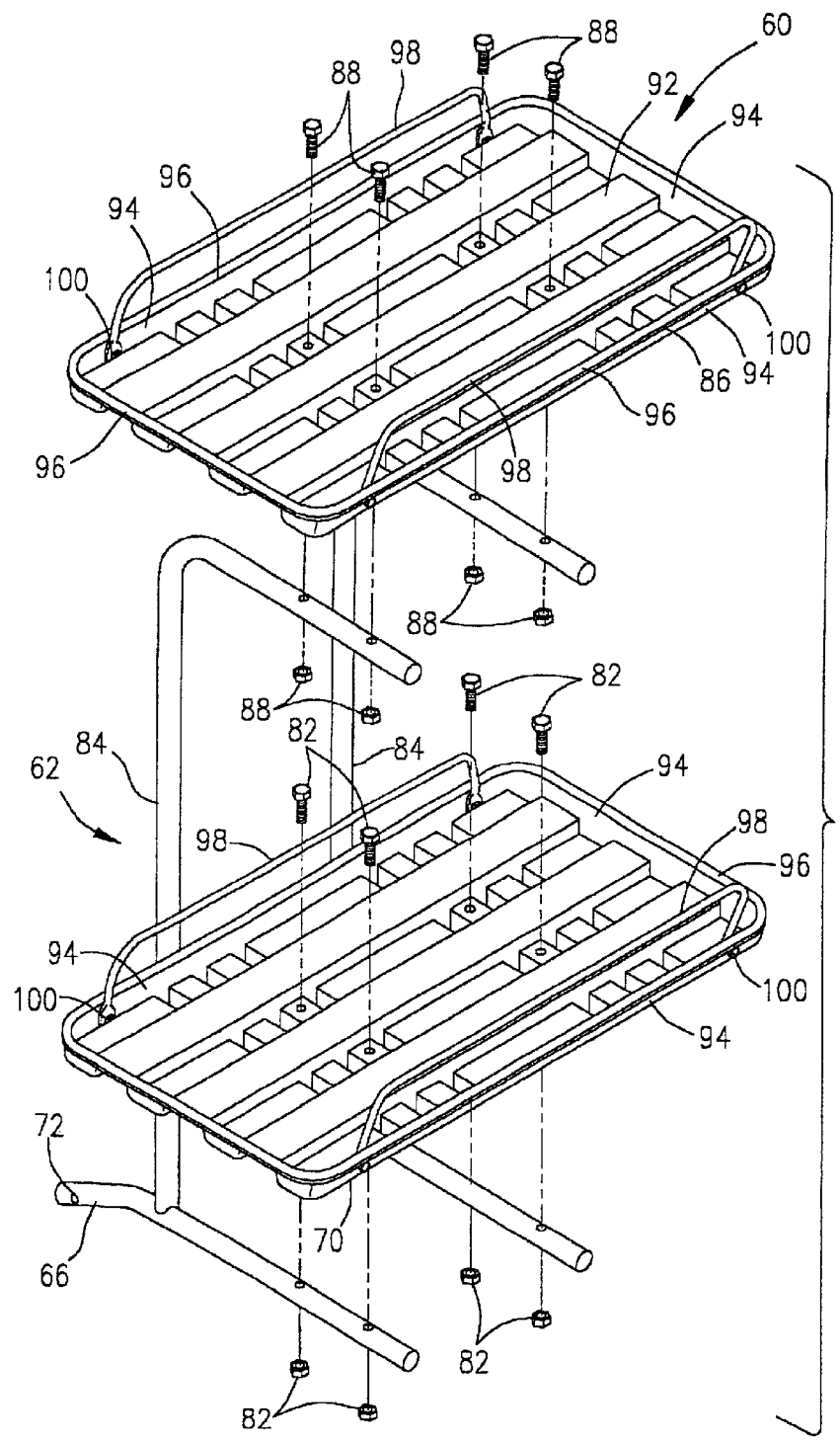
FIG. 2 is an exploded perspective view of the double decker article carrier of the present invention.
Figure 3:
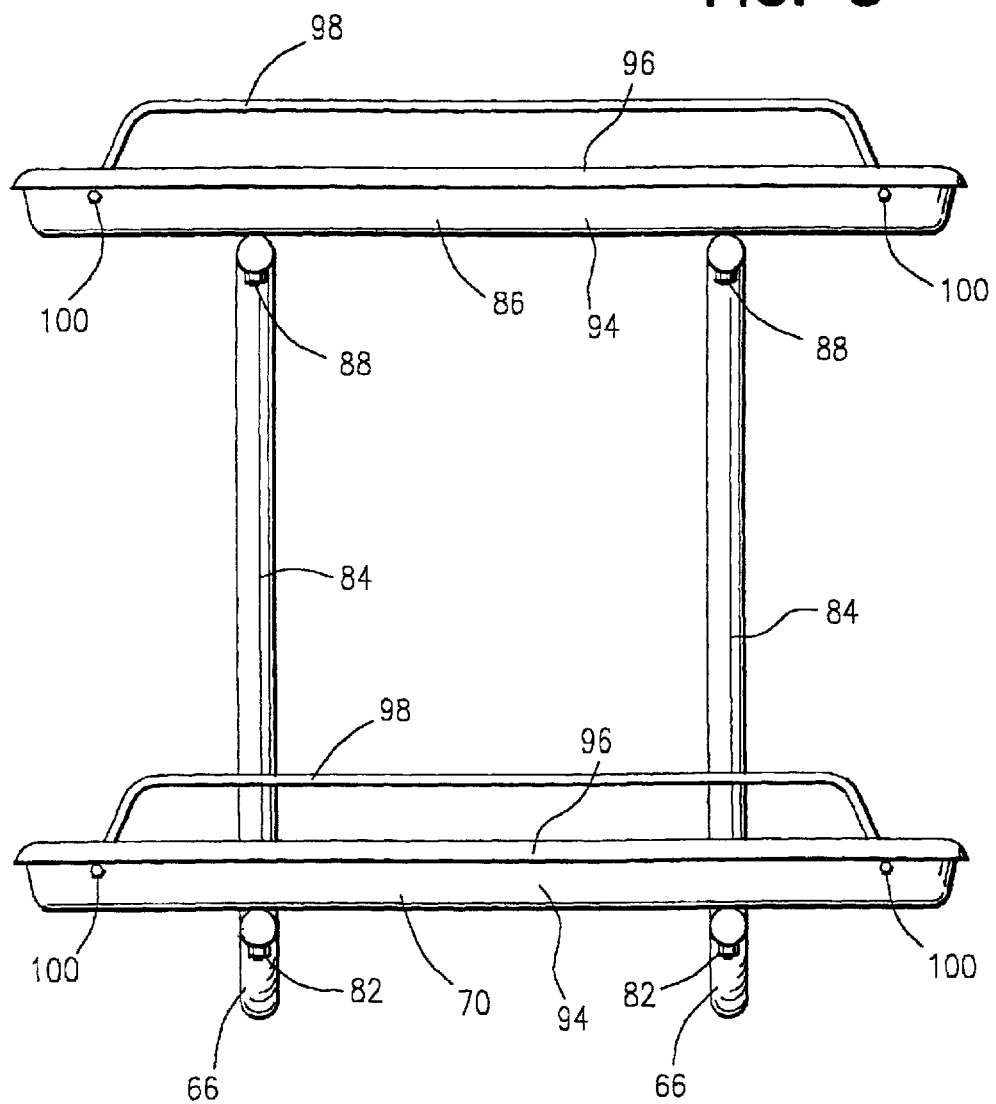
FIG. 3 is a rear elevational view of the double decker article carrier of the present invention.
Figure 4:
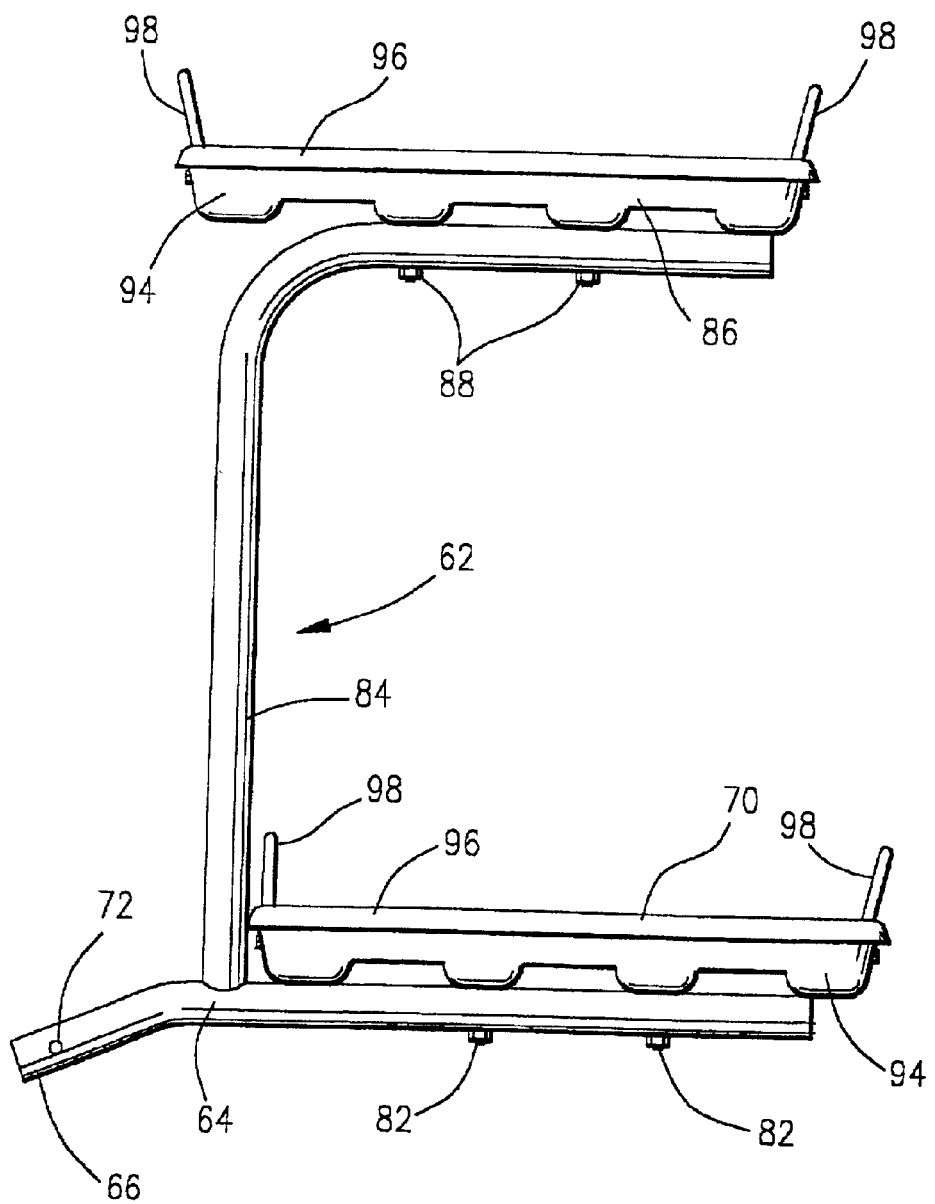
FIG. 4 is a right side elevational view of the double decker article carrier of the present invention.

As best shown in FIGS. 2–4, the double decker article carrier 60 of the present invention may be mounted to the receiver assembly 10 shown in FIG. 1. Specifically, the double decker article carrier 60 includes a frame generally designated by reference numeral 62. The frame 62 has a pair of mounting bars 64. Each mounting bar 64 includes a proximal end 66 for securing in an accessory receiver 50 of the receiver assembly 10 and receives and holds a first article carrier platform 70. As shown, the proximal ends 66 of the mounting bars 64 have a circular cross section that is concentrically received and snugly fits within the accessory receivers 50.

A pair of aligned mounting apertures 72 are provided at opposed sides of the proximal ends 66. When the ends 66 of the mounting bars 64 are properly inserted in the accessory receivers 50, the mounting apertures 72 are aligned with the cooperating apertures 54 in the side wall of the accessory receivers. A pin 74 (see FIG. 1) of a type known in the art is then inserted through the aligned apertures 54, 72 and a cooperating pin clip 76 is utilized to secure the pin in position and complete the connection. More specifically, the pin 74 includes a head 78 at one end and a pin clip receiving groove 80 adjacent the opposite end. Together, the head 78 and the pin clip 76 prevent the pin 74 from being inadvertently removed from the aligned apertures 54, 72 in the receiver 50 and bar 64 respectively so as to complete a secure and positive connection.

The first platform 70 may, for example, take the form of a molded plastic tray with a corrugated bottom for added strength as illustrated in the drawing figures. Alternatively, the platform 70 may be made from other relatively high strength and low weight materials such as aluminum and may also include other configurations. The platform 70 is secured to the bar 64 of the two mounting bars 64 by means of fasteners 82. The illustrated fasteners 82 comprise cooperating nuts and bolts which are received in aligned apertures in the first platform 70 and the mounting bars 64. Of course, any other appropriate fastening means of a type known in the art may be utilized.

Projecting upwardly and welded to each mounting bar 64 is a support member 84. Each support member 84 is substantially shaped like an L. While welding is a convenient and efficient way to secure steel support members 84 and steel mounting bars 64 together, it should be appreciated that other fastening arrangements could be utilized including but not limited to cooperating brackets and fasteners and pin and socket arrangements.

A second platform 86, which may be constructed in the same manner as the first platform 70, is carried on the support members 84. Fasteners 88 are utilized to secure the second platform 86 to the support members 84. The fasteners 88 may take the form of cooperating nuts and bolts as illustrated in the drawing figures. Specifically, the bolts extend through cooperating, aligned apertures in the second platform 86 and the support members 84. The second platform 86 and the support members 84 then are secured together by tightening the nuts on the bolts. Of course, as noted above with regard to the fasteners 82, substantially any other appropriate fasteners of a type known in the art may be utilized to achieve this purpose.

Each of the platforms 70, 86 may include various openings (not shown) in the bottom wall 92 thereof. These openings allow for water to drain from the platforms 70, 86 and also provide a place to secure bungee cords, ropes or tie lines utilized to secure articles on the platforms. Side walls 94 on the platforms 70, 86 further help to maintain those articles in position. Those side walls 94 also incorporate a rounded lip 96 for added strength.

In addition to the side walls 94, each of the platforms 70, 86 may also carry a tie rod 98. In the illustrated embodiment, front and rear tie rods 98 are provided on each platform 70, 86. The tie rods 98 are secured to the platforms by cooperating nut and bolt fasteners 100 which extend through cooperating apertures in the ends of the tie rods 98 and the side walls 94 of the platforms 70, 86.

As shown, the tie rods 98 project upwardly above the top of the side walls 94 thereby providing additional support to articles carried on the platforms 70, 86. Additionally, the tie rods 98 provide a convenient point for securing the hook of a bungee cord or for tying off any line used to secure an article to the platforms 70, 86.

As should be appreciated, the platforms 70, 86 are aligned and stacked when secured and mounted on the frame 62. The platforms 70, 86 function to carry various articles at a point only slightly rearwardly removed from the point of connection with the receiver assembly 10. As a result, the weight of the articles is carried closer to the rear axle of the towing vehicle where it may be more efficiently and effectively supported.

It should also be appreciated that the double decker article carrier 60 provides great versatility in storing and carrying articles. Specifically, either one of the platforms 70, 86 may be removed if desired. For example, if the second, upper platform 86 is removed from the support members 84, taller articles may be carried on the first, lower platform 70.

Further, it should be appreciated that the upwardly depending support members 84 are available to help secure those taller articles in place. This enhances the versatility of the article carrier 60 so that it is suitable for many, many applications.

The foregoing description of the preferred embodiment of this invention has been presented for purposes of illustration and description. It is not intended to be exhaustive or to limit the invention to the precise form disclosed. Obvious modifications or variations are possible in light of the above teachings. For example, the bars 64 which allow stable two-point connection in the accessory receivers 50 could be plugged into a T-shaped adapter having a single mounting bar for securing in the receiver box 18 of a trailer hitch receiver assembly. In this way the article carrier of the present invention may be secured in a standard trailer hitch receiver assembly not incorporating any accessory receivers 50. Conversely, the bars 64 may be secured in the cooperating accessory receivers 50 of a receiver assembly 10 that does not include any trailer hitch receiver box 18 and provides no trailer towing function, just accessory mounting.

The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A double decker article carrier for mounting to a receiver assembly on a vehicle, comprising:
    a frame including a pair of spaced apart mounting bars for securing said frame to the receiver assembly and a pair of spaced apart support members;
    a first platform carried on said pair of mounting bars;
    a second platform carried on said pair of support members so as to at least partially overlie the first platform; and
    fasteners for securing said first and second platforms to said pair of mounting bars and said pair of support members respectively so that a storage space is provided between the first and second platforms.

2. The double decker article carrier of claim 1, further including at least one tie rod secured to said first platform.

3. The double decker article carrier of claim 1, further including at least one tie rod secured to said second platform.

4. The double decker article carrier of claim 1, wherein each of said pair of support members is substantially L-shaped.

5. The double decker article carrier of claim 1, wherein said first and second platforms are carried in an aligned, stacked configuration.

6. The double decker article carrier of claim 5, wherein said first and second platforms are substantially identical.

7. The double decker article carrier of claim 1, wherein each mounting bar of said pair of mounting bars includes a mounting aperture in a proximal end.

8. The double decker article carrier of claim 7, wherein a pin is received in each said mounting aperture.

* * * * *